United States Patent
Subramanian et al.

(10) Patent No.: US 7,207,047 B2
(45) Date of Patent: Apr. 17, 2007

(54) SYSTEM AND METHOD FOR RECOVERING APPLICATIONS

(75) Inventors: Ramesh Subramanian, Gloucester (CA); James Birchall, Darthmouth (CA); Andrew Van Beek, Chelsea (CA)

(73) Assignee: Corel Corporation (CA)

( * ) Notice: Subject to any disclaimer, the term of this patent is extended or adjusted under 35 U.S.C. 154(b) by 248 days.

(21) Appl. No.: 09/903,100

(22) Filed: Jul. 11, 2001

(65) Prior Publication Data

US 2003/0018681 A1    Jan. 23, 2003

(30) Foreign Application Priority Data

May 10, 2001 (CA) .................................. 2347404

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/313; 714/2; 714/15

(58) Field of Classification Search .......... 714/1–57; 719/310–320, 328–330
See application file for complete search history.

(56) References Cited

U.S. PATENT DOCUMENTS

| | | | |
|---|---|---|---|
| 5,305,455 A * | 4/1994 | Anschuetz et al. | 709/100 |
| 5,815,702 A * | 9/1998 | Kannan et al. | 712/244 |
| 5,870,763 A | 2/1999 | Lomet | 707/202 |
| 5,911,060 A | 6/1999 | Elliott | 395/500 |
| 5,916,308 A | 6/1999 | Duncan et al. | 709/305 |
| 5,946,698 A | 8/1999 | Lomet | 707/202 |
| 6,003,095 A | 12/1999 | Pekowski et al. | 709/305 |
| 6,009,258 A | 12/1999 | Elliott | 395/500.43 |
| 6,021,262 A | 2/2000 | Cote et al. | 395/185.01 |
| 6,029,207 A | 2/2000 | Heninger | 709/305 |
| 6,035,121 A | 3/2000 | Chiu et al. | 395/705 |
| 6,173,421 B1 * | 1/2001 | Weaver Johnson et al. | 714/38 |
| 6,230,284 B1 * | 5/2001 | Lillevold | 714/13 |
| 6,279,121 B1 * | 8/2001 | Gamo | 714/15 |
| 6,415,381 B1 * | 7/2002 | Bak et al. | 712/244 |
| 6,421,740 B1 * | 7/2002 | LeCroy | 719/331 |
| 6,591,379 B1 * | 7/2003 | LeVine et al. | 714/38 |
| 6,651,163 B1 * | 11/2003 | Kranich et al. | 714/11 |

OTHER PUBLICATIONS

C. Dony, "Improving Exception Handling with Object-Oriented Programming", IEEE, 1990, pp. 36-42.*
Q. Cui, et al, "Data-Oriented Exception Handling", IEEE, 1992, pp. 393-401.*

* cited by examiner

*Primary Examiner*—Meng-Al T. An
*Assistant Examiner*—Diem Ky Cao
(74) *Attorney, Agent, or Firm*—Hayes Soloway P.C.

(57) ABSTRACT

An operating system has a top level exception handler which terminates an application as a default action upon receipt of any exceptions. An application recovery system traps an exception which is dispatched to the top level exception handler before it reaches the top level exception handler. In the event, an exception cannot be resolved, the application recovery system terminates a thread that caused the exception, and continues execution of the application.

20 Claims, 4 Drawing Sheets

SYSTEM AND METHOD FOR RECOVERING APPLICATIONS

This invention relates to a system and method for recovering applications and more particularly, to a system and method for recovering applications from run time problems.

BACKGROUND OF THE INVENTION

There are a number of barriers to successful execution of an application on a computer. The computer is operated by an operating system having an executor. The executor executes code or instructions of the application. There are some situations when the executor cannot execute the code contained in the application. Examples of such situations include dividing by zeros and writing to memory that either does not exist or is invalid.

These situations are detected by the hardware of the computer and passed to the operating system as "interrupts". This means that the operating system is to "interrupt" the thread that is currently executing a piece of code of the application, and cause the interrupt. Some of interrupts are expected by the computer, and are used to signal the operating system that something has happened in the hardware. Such expected interrupts are handled by the operating system. Other times, interrupts mean that the hardware is communicating to the operating system that an instruction of the application cannot be completed because of some "exceptional" conditions. These "exceptional" interrupts are known as "exceptions".

Conventionally, applications do not have any mechanism that let themselves handle these exceptions programmatically. Thus, the operating system gets these exceptions first and, if the operating system is not able to handle the exception, it terminates the application as a default action of the operating system. Thus, the user does not have an opportunity to save its work prior to the termination of the application. Such premature termination of applications are caused by the life-cycle of these exceptions.

In the Microsoft Windows kernel (Win32), an exception handler is provided to handle exceptions occurred in Win32 applications. The exception handler has a process-wide top-level exception filter. The default action of the top-level exception filter is to terminate the application. When an exception occurs, the CPU of the computer suspends the current path of execution, and transfers control to the exception handler. Some exceptions are handled by the exception handler. Any exception that reaches the Win32 top-level exception filter will cause the application to close without saving any data.

Traditionally, this situation has been handled by having the application perform periodic saves while the application is running. Although this works well in any situation, including power failures, it still introduces a large "panic-factor" into any exceptional condition. Any changes made between a periodic save and the closing of the application will be lost. Basically, the application still fails even when something as catastrophic as a null pointer exception is encountered. Such a situation is unacceptable to the user.

Application recovery is the art of maintaining an application in an executable state regardless of internal conditions. There are some attempts to programmatically perform application recovery.

Microsoft File Recovery uses an on-demand repair which allows applications to repair themselves if they come across any problems during application execution. This program uses a management API of the Windows to programmatically determine the path to specific install package components that are installed on a computer. The primary use of their API is to enable the Windows Installer service to manage all file paths on behalf of the application. At run time, the application can ask the Windows Installer service for a path to a given component. If a file path problem occurs in an application at run time, the Windows Installer service can repair the problem by recopying the necessary files to the appropriate folder. However, this seems to deal with the file path problems only.

It is therefore desirable to provide a system and method which increases the chances of success of application recovery from runtime problems.

SUMMARY OF THE INVENTION

An operating system has a top level exception handler which terminates an application as a default action upon receipt of any exceptions occurred due to runtime problems of an application. The present invention traps an exception before it reaches the top level exception handler. Thus, premature termination of the application is prevented in a case of a runtime problem. In preferred embodiments, the invention attempts to return the application to the last known good state.

In accordance with an aspect of the present invention, there is provided a method for recovering an application from a runtime fault. The method comprises steps of receiving an exception caused due to a runtime fault in a thread; dispatching the exception to an exception handler; trapping the exception before the exception reaches the exception handler when the exception handler is a top level exception handler which terminates the application; and continuing execution of the application.

In accordance with another aspect of the present invention, there is provided a method for recovering an application from a runtime fault in a thread. The application is executed under an operating system having one or more low level exception handlers and a top level exception handler. The method comprises steps of trapping an exception which is despatched to the top level exception handler before the exception reaches the top level exception handler, a default action of which is to terminate the application upon receipt of exceptions; and continuing execution of the application.

In accordance with another aspect of the present invention, there is provided an application recovery system for recovering an application from a runtime fault caused in a thread. The application runs under an operating system having an exception dispatcher, one or more low level exception handlers and a top level exception handler which terminates the application. The application recovery system comprises an exception trapper and a trapped exception handler. The exception trapper is placed between the exception dispatcher and the top level exception handler, and provided for trapping an exception before the exception reaches the top level exception handler. The trapped exception handler is provided for handling the trapped exception.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
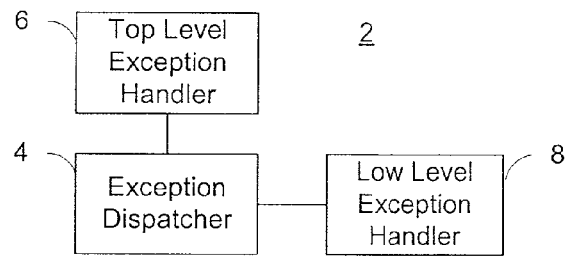
FIG. 1 is a block diagram showing an example of an existing exception handler.
Figure 2:
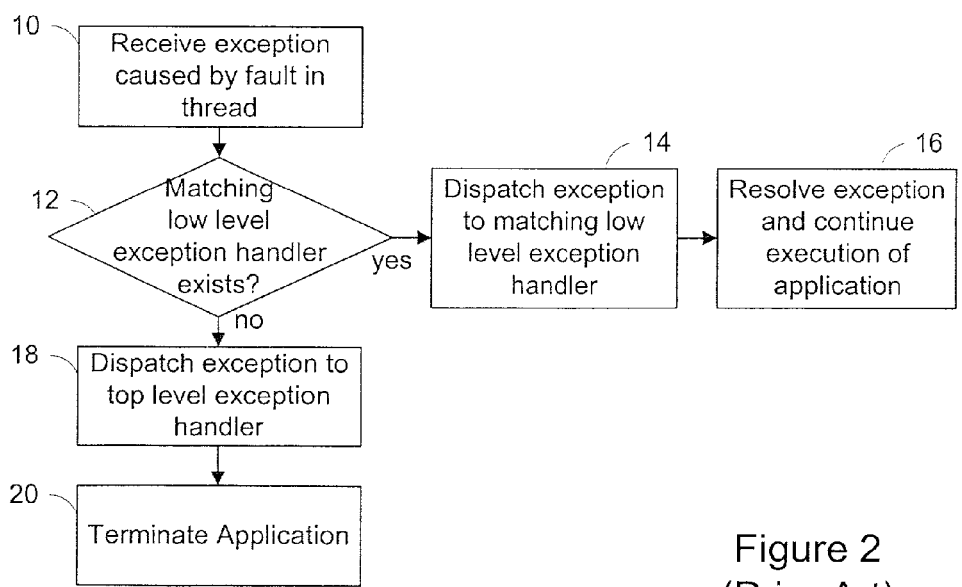
FIG. 2 is a flowchart showing the operation of the exception handler shown in FIG. 1.

Prior to describing embodiments of the present invention, a typical existing OS exception handler of an Operating System (OS) is described referring to FIGS. 1 and 2. The OS exception handler 2 has an exception dispatcher 4, a top level exception handler 6 and one or more lower level exception handlers 6.

During execution of an application, the executor of the operating system creates a primary thread to execute the code of the application. The application, during its execution cycle, may create any number of threads. As shown in FIG. 2, when the computer hardware detects a fault in a thread, the exception dispatcher 4 receives an exception from the computer hardware (10). The exception dispatcher 4 determines if there exists a low level exception handler 8 that matches the exception, i.e., that is capable of resolving the exception (12). It may use a look up table to select a matching lower level exception handler 8. If a matching lower level exception handler 8 exists, the exception dispatcher 4 dispatches the exception to the matching low level exception handler (14). The matching low level exception handler 8 resolves the exception, and the executor of the operating system continues execution of the application (16).

If there is no low level exception handler that matches the exception (12), the exception dispatcher 4 dispatches the exception to the top level exception as a default action (20). Thus, the application is terminated without executing any other code.

Figure 3:
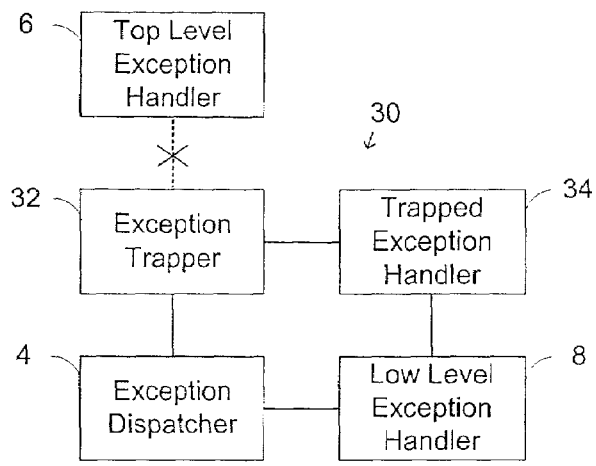
FIG. 3 is a block diagram showing an application recovery system in accordance with an embodiment of the present invention.
Figure 4:
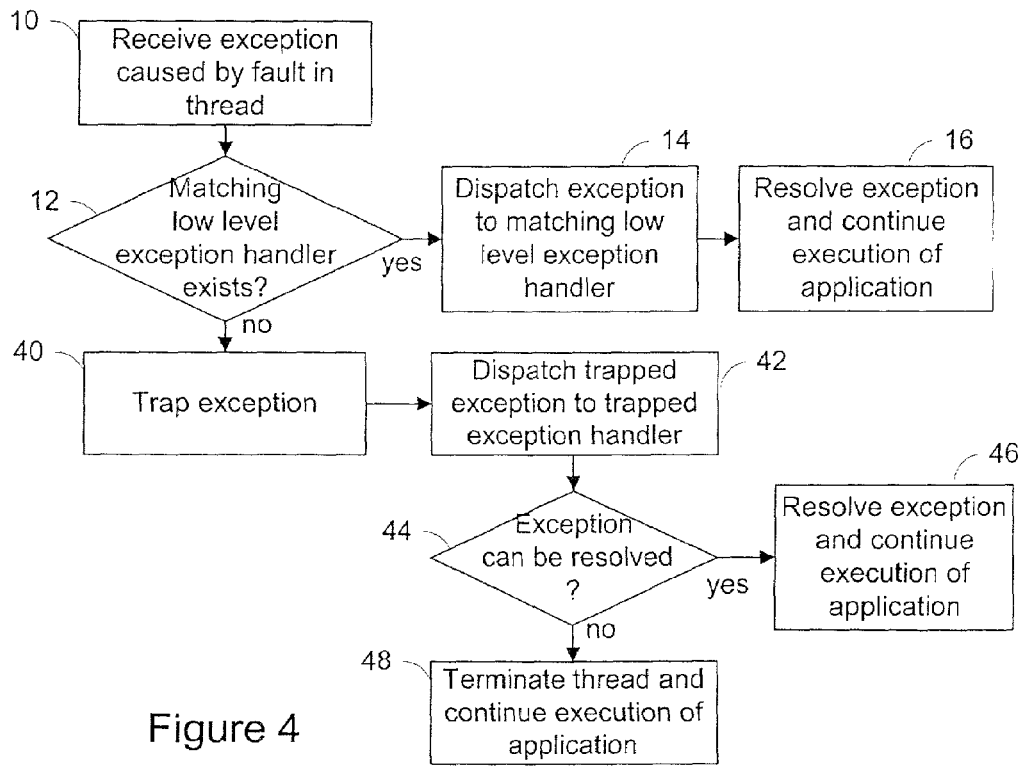
FIG. 4 is a flowchart showing the operation of the application recovery system shown in FIG. 3.

Now, referring to FIGS. 3 and 4, an application recovery system 30 in accordance with an embodiment of the present invention is described. In FIGS. 3 and 4, similar elements or steps to those in FIGS. 1 and 2 are indicated with the same reference numerals.

The application recovery system 30 comprises an exception trapper 32 and a trapped exception handler 34. The exception trapper 32 is placed between the exception dispatcher 4 and the top level exception handler 6 of the OS exception handler 2 so that exceptions dispatched to the top level exception handler 6 can be trapped by the exception trapper 32 prior to reaching the top level exception handler 6. The exception trapper 32 may be provided in place of the top level exception handler 6.

As shown in FIG. 4, when there is no lower level exception handler that matches the exception (12), the exception trapper 4 traps the exception before it reaches the top level exception handler 6 (40). The exception trapper 32 dispatches the trapped exception to a trapped exception handler 34 (42). If the trapped exception handler 34 is capable of resolving the trapped exception (44), it resolves the trapped exception and continues the execution of the application (46). If the trapped exception handler 34 is not capable of resolving the trapped exception (44), it terminates the thread that caused the exception, and continues the execution of the application (46).

Thus, the application will not be terminated by the top level exception handler 6. Even if the exception cannot be resolved, the application recovery system 30 allows the execution of some code of the application before the application is terminated. Thus, an exceptional condition need not result in the termination of the application. For example, when a worker thread fails and executes without a message queue, only the worker thread needs to be terminated and the application may be restored to the state that it was in before the thread failed.

Figure 5:
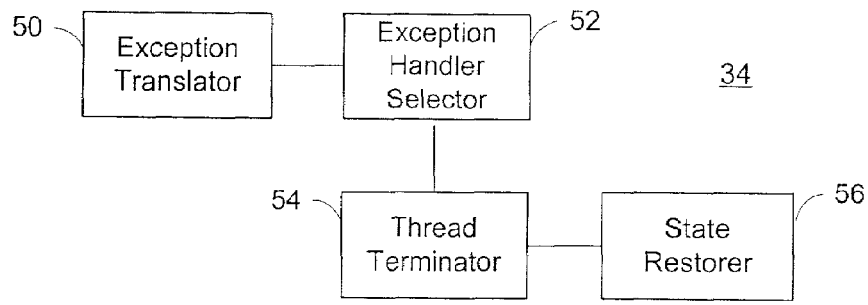
FIG. 5 is a block diagram showing an example of a trapped exception handler shown in FIG. 3.

As shown in FIG. 5, the trapped exception handler 34 may include an exception translator 50, an exception handler selector 52, a thread terminator 54 and a state restorer 56.

Figure 6:
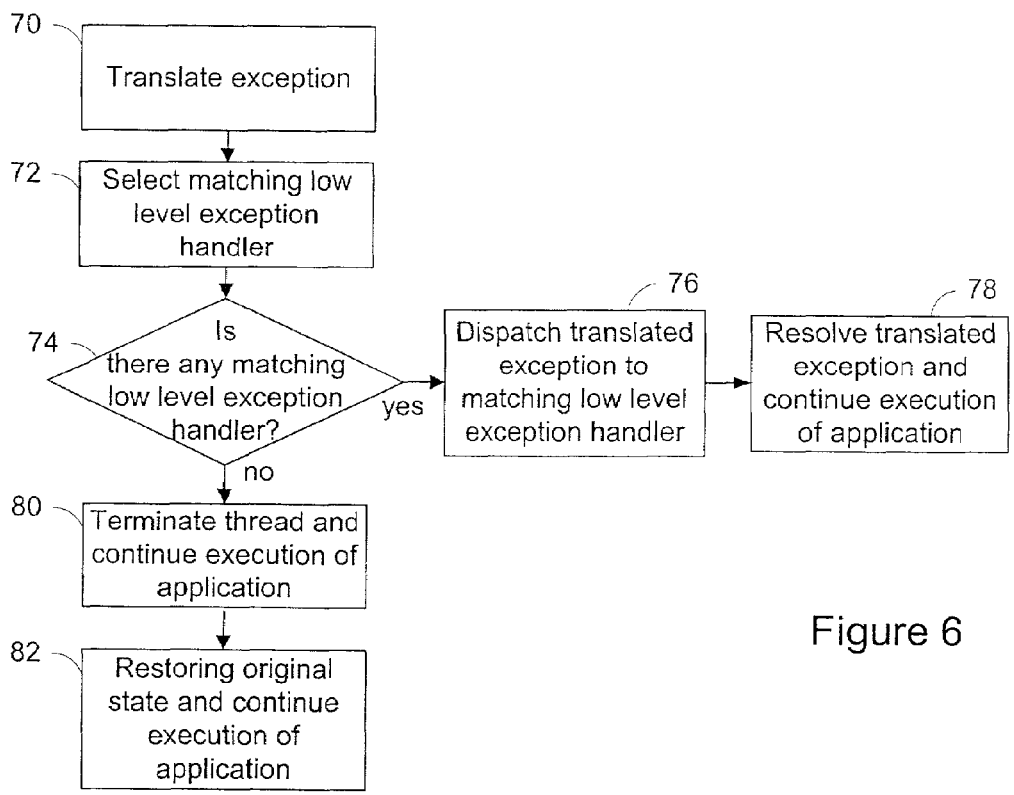
FIG. 6 is a flowchart showing the operation of the trapped exception handler shown in FIG. 5.

As shown in FIG. 6, the exception translator 50 passes the exception to be resolved by one of low level exception handlers 8 in the exception handler 2 of the operating system (70). The exception handler selector 52 selects a low level exception handler 8 that matches the translated exception (72). If there is such a matching low level exception handler 8 (74), then it dispatches the translated exception to the matching low level exception handler 8 (76). The translated exception is resolved and the execution of the application continues (78).

If there is no matching low level exception handler 8 (74), then the thread terminator 54 terminates the thread that caused the exception (80). The state restorer 56 restores the state that the application was in before the thread failure, and the execution of the application is continued (82).

Figure 7:
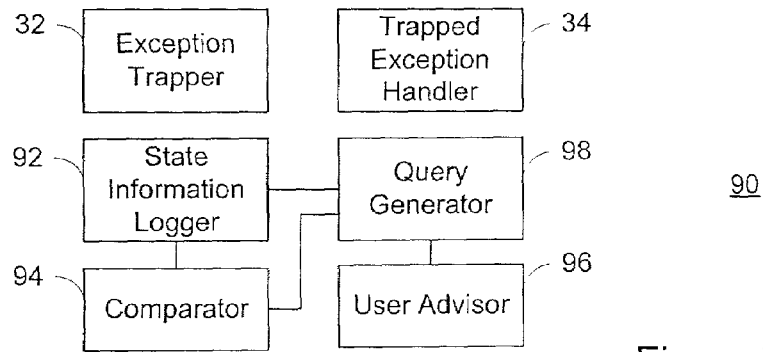
FIG. 7 is a block diagram showing an application recovery system in accordance with another embodiment of the present invention.

FIG. 7 shows an application recovery system 90 in accordance with another embodiment of the invention. The recovery system 90 has an exception trapper 32 and a trapped exception handler 34, as in the recovery system 30 shown in FIG. 3. In addition, the recovery system 90 has a state information logger 92, a comparator 94, an user advisor 96 and a query generator 98.

Figure 8:
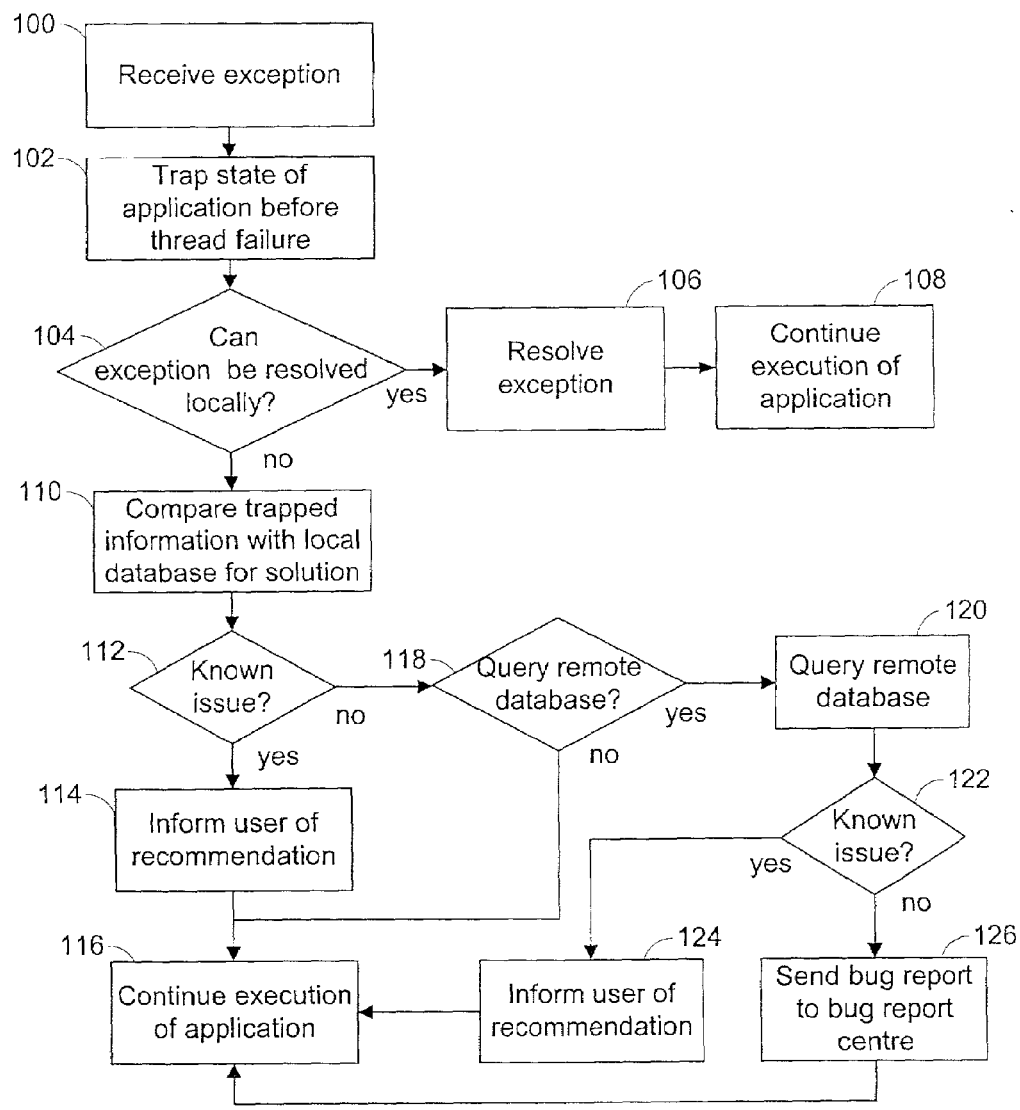
FIG. 8 is a flowchart showing the operation of the application recovery system shown in FIG. 7.

An example of the operation of the recovery system 90 is described referring to FIG. 8.

The recovery system 90 is started when the application starts up. When the recovery system 90 receives an exception (100), the state information logger 92 logs the state information that the application was in before the thread failure occurred (102). The state information may include the information of the application and computer just before the thread failure.

If the exception may be resolved locally (104), the exception is resolved as described above referring to FIGS. 4 and 6 (106), and the execution of the application is continued (108).

If the exception cannot be resolved locally (104), the comparator 94 compares the state information with a local database to search for a solution (110). If the exception is a known issue in the local database (112), the comparator 94 retrieves solution information found in the local database, and the user advisor 96 informs the user of the solution information (114). The solution information may include information of the problem caused the exception and recommendation for resolving the problem. Then, the execution of the application is continued (116).

If the exception is not a known issue in the local database (112), the recovery system 90 may query a remote database (118). The remote database may be provided in a computer of a manufacturer or merchant of the application. When it is to query a remote database (118), the query generator 98 generates a query with the state information to the remote database (120). If the problem is a known issue at the remote database (122), solution recommendation is returned to the recovery system 90 and the user advisor 96 informs the user of the solution recommendation (124). If it is not a known issue (122), the query generator 98 may send a bug report to a bug report centre (126). The bug report centre may be provided in a manufacture computer, and the bug report may be used for further debugging process. In either case, the execution of the application is continued (116).

Thus, the application recovery system 90 may store information about the state that the application was in just before it failed. This information allows initiation of a bug report using accurate information.

The recovery system 90 and the remote database and the bug report centre may be connected through one or more computer networks, such as the Internet.

Another embodiment of the present invention using a Win32 function is described.

Under the Win32 Exception Handling, when an exception occurs, the CPU suspends the current path of execution in preparation for transferring control to the exception handler. The CPU saves the current executing state by pushing its flags register (EFLAGS), the code segment register (CS), and the instruction pointer (EIP) onto a stack. Next, the exception code is used to look up and transfer control to the address where the designated handler for this exception resides. At the most fundamental level, the exception code is merely an index into CPU's Interrupt Descriptor Table (IDT), which indicates where the exception should be handled. The IDT is a fundamental data structure comprising an array of interrupt descriptors. It is under the control of the operating system.

The action of certain exception handlers, such as access violations and stack overflows, in Win32 is to create a structure in the faulting thread's memory that contains information about the fault which was pushed onto the stack, and then to push pointers to this structure onto the thread's stack. The operating system then looks at the user-process and determines if the process has exception handling enabled. If it does, it passes this information off to the exception handler and assumes that the exception has been handled.

When an exception occurs in user-mode code, the system first checks to see if the process is being debugged or not. If it is, it passes the exception off to the debugger as a "first-chance exception". If the process is not being debugged, or if the associated debugger does not handle the exception, the system next attempts to locate a frame-based exception handler by searching the stack frames of the thread in which the exception occurred. The system searches the current stack frame first, then searches through preceding stack frames in reverse order. If no frame-based handler can be found, or no frame-based handler handles the exception, but the process is being debugged, the system notifies the debugger a second time. This is known as a "second-chance exception" and usually results in the debuggers handling the exception. Finally, if the process is not being debugged, or if the associated debugger does not handle the exception, the system provides default handling based on the exception type. For most exceptions, the default action is to call the ExitProcess function which results in the dreaded application termination.

Win32 provides a function, SetUnhandledExceptionFilter, that allows replacement of the standard top-level exception handler with a different handler. The present embodiment of the invention uses this function to provide a replacement handler that replaces for the standard top-level exception handler. The replacement handler terminate the thread if it is a worker thread and log the error. It does not terminate the application. If a stable state is determined to put the application into, then the replacement handler returns the application to the stable state without causing the application to exit.

After calling the SetUnhandledExceptionFilter function, if an exception occurs in a process that is not being debugged, and the exception makes it to the Win32 unhandled exception filter, the SetUnhandledExceptionFilter calls an exception filter function specified by the lpTopLevelExceptionFilter parameter. For example, the exception filter function may be specified as follows:

```
LPTOP_LEVEL_EXCEPTION_FILTER SetUnhandledExceptionFilter (
PTOP_LEVEL_EXCEPTION_FILTER lpTopLevelExceptionFilter
// exception filter function
);
```

The parameter lpTopLevelExceptionFilter is a pointer to a top-level exception filter function that will be called whenever the UnhandledExceptionFilter function gets control, and the process is not being debugged. A value of NULL for this parameter specifies default handling within UnhandledExceptionFilter, which results in the termination of the application. Accordingly, by setting the parameter to a value other than NULL, the termination of the application is prevented.

The filter function has syntax congruent to that of UnhandledExceptionFilter. It takes a single parameter of type LPEXCEPTION_POINTERS, and returns a value of type LONG. The filter function returns one of the values: EXCEPTION_EXECUTE_HANDLER, EXCEPTION_CONTINUE_EXECUTION, and EXCEPTION_CONTINUE_SEARCH.

EXCEPTION_EXECUTE_HANDLER is a value returned from UnhandledExceptionFilter and executes the associated exception handler. This value usually results in the process termination. EXCEPTION_CONTINUE_EXECUTION is a value returned from UnhandledExceptionFilter and continues the execution from the point of the exception. The filter function is free to modify the continuation by modifying the exception information supplied to its LPEXCEPTION_POINTERS parameter. EXCEPTION_CONTINUE_SEARCH proceeds with normal execution of UnhandledExceptionFilter. That means obeying the SetErrorMode flags, or invoking the application pop-up message box.

The SetUnhandledExceptionFilter function returns the address of the previous exception filter established with the function. A NULL return value means that there is no current top-level exception handler.

Issuing SetUnhandledExceptionFilter replaces the existing top-level exception filter for all existing and future threads in the calling process.

The present invention is further described below by examples of application recovery systems for recovering Microsoft Foundation Classes (MFC) or C++ based applications from runtime problems.

MFC installs various exception handlers at different spots throughout the code. The reason that access violations and stack overflows result in the termination of an application is that they are not handled by any other default exception handlers included in MFC code except for the UnhandledExceptionFilter function installed as the top-level exception handler for the process. The default action of the UnhandledExceptionFilter function is to terminate the application. This is what results in an Illegal Page Fault (IPF) terminating an application.

In this example an application recovery system is provided as a structured exception handling (SEH) block. The structured exception handling is used to recover a crashed application from IPFs and other runtime problems.

The SEH block is provided around the PumpMessage( ) call in the applications' CWinApp override. In case of an exception caused by an IPF, the SEH block provides a logging mechanism of getting the current state of registers, i.e., state information of the application and computer. The logging mechanism also retrieves currently loaded modules, their version numbers and other useful memory references, which can be used as a unique signature into the IPF.

The SEH block traps the exception on the message pump level. At this level, most of the IPFs can be recoverable. Thus, IPFs will usually just result in unwinding from the current message processing. This will give an opportunity for the users to save their work.

The SEH block overrides CwinApp::ProcessWndProException with a callback that allows the application to determine if any special conditions need to be met before terminating a message. Thus, even if an exception cannot be resolved, the SEH block can prevent termination of the application until other condition is met.

Alternatively, the SEH block may Install a top-level exception handler with a callback that will allow the application to determine what it should do instead of terminating. This may be done by using the SetUnhandledExceptionFilter Win32 function.

Further, the SEH block may retrieve an appropriate remedial procedure from the Internet for the given problem and make appropriate suggestions to the user.

The logged state information can be sent to a Web server of the manufacturer of the application for a lookup into a database maintained by the Tech Support of the manufacturer. Thus, the SEH block it may retrieve a remedial procedure if any, and it may display the remedial procedure on the user system. It may also suggest a service patch download or incompatible DLLs/drivers.

Another example provides an application recovery system as a crash recovery manager (CRM). Before a message queue is created for an application and the application message pump engaged, any terminal exceptions do not usually have a stable state to fall back to. The CRM logs the exception before terminating either the thread in the case of a worker thread gone awry, or the application. To set a pre-queue handler, the CRM uses the process wide unhandled exception filter function:
LPTOP_LEVEL_EXCEPTION_FILTER SetUnhandledExceptionFilter (LPTOP_LEVEL_EXCEPTION_FILTER IpTopLevelExceptionFilter//exception filter function);

The function that is passed as the IpTopLevelExceptionFilter is CRM-specific and resides at an exception level just below the application when installed. All of its logging functions are enclosed within a try-catch block of C++ Exception Handling that will ensure that no exception gets passed to a top level exception handler, the Win32 global UnhandledException Filter function which terminates the application as a default action upon receipt of any exception.

The CRM installs a second exception handler after the message queue has been created for the application and the main message pump is in operation. The second exception handler is as follows:
virtual LRESULT ProcessWndProException(CException*e, const MSG*pMsg);

In this situation, the CRM overrides the default Microsoft Foundation Classes (MFC) message handler that simply unwinds a thread stack and eats the message with one that calls an application defined callback that supplies application-specific handling before unwinding the thread stack and eating the message. It is further preferable to specify to the application what happened to the message and/or change conditions to let it re-execute the instruction and continue at the next line of code of the application. If the system uses a different framework, rather than MFC code, the CRM may enclose the WindowsProc pump code in a try-catch block similar to the one found in AfxWindowsProc which calls this function.

Each of the exception handlers relies upon two situations: the application logging and the application Structured Exception translator. The structured Exception translator is provided as the exception filter (CwinThread::ProcessWndProException) does not, by default handle exceptions such as access violations which are structured in the old C-style. Such exceptions are called Structured Exceptions in Win32 parlance and need to be translated into C++ style MFC exceptions before the application can handle them. Normally, without the CRM, since the application does not know what to do with these exceptions, they do not get handled by default, and get populated to the IpTopLevelExceptionFilter which result in termination of the application. To remedy this, the CRM employs a thread-specific MSC Runtime function called:

_se_translator_function_set_se_translator(_se_translator_function se_trans_func);

This function translates the C-style exception into a C++ structured exception. The CRM then goes one step further by throwing this new exception as a class derived from CException which is the MFC implementation of C++ styled exceptions. Because of the nature of this function and where it gets installed, namely in the memory allocated to a thread, the CRM includes initialization routine for every thread.

Logging of the state information is accomplished by extracting information based on the address of the function to determine in which module the exception occurred. The CRM uses a number of Win32 global functions to determine various system information including the platform and operating system as well as functions included in other DLLs for DLL versions and DLLs loaded in process. The CRM has a DLL recovery module that loads required DLLs explicitly when they are needed. Because the application logging is enclosed in a try-catch block, any problems encountered will simply terminate the logging feature without disabling the recovery feature.

The CRM may be provided with a callback function for the actions upon encountering an error. Such a provision causes the CRM to be flexible. Also, the application may provide a mechanism by which the error information can be automatically transmitted to a computer of the manufacturer. Because the application version and the exception address provide a unique signature for any particular crash, the CRM enables pro-active retrieval of updates and bug-fixes from the manufacture computer automatically so that the application may fix itself.

The application recovery system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention. For example, the elements of the application recovery system are described separately in the above embodiments. However, two or more elements may be combined in a single element. Also, one or more elements may be shared with a different computer in the computer.

What is claimed is:

1. A method for recovering an application from a runtime fault, the method comprising steps of:
   receiving an exception caused due to a runtime fault in a thread executing an instruction of a C++ based application;
   dispatching the exception to an exception handler;
   trapping the exception before the exception reaches the exception handler when the exception handler is a top level exception handler which terminates the application;
   translating the trapped exception into a C++ exception that the C++ based application is capable of handling, wherein the trapped exception is translated into the C++ exception which is able to be resolved by an application defined C++ exception handler;
   determining if there is an application based C++ exception handler which is capable of resolving the translated exception;
   terminating the thread that caused the exception when there is no C++ based exception handler which is capable of resolving the translated exception;
   calling an application defined callback that supplies application-specific handling which re-executes the instruction and continues at a next line of code of the application; and
   continuing execution of the application.

2. The method recited in claim 1, wherein the continuing step allows continuing execution of the application after the thread is terminated.

3. The method recited in claim 1 further comprising a step of logging state information representing the state that the application was in before occurrence of the exception caused the termination of the thread.

4. The method recited in claim 3 further comprising a step of forwarding the logged information to a remote database over a computer network.

5. The method recited in claim 4 further comprising steps of:
   receiving a recommendation from the remote database; and
   informing the recommendation to the user.

6. The method recited in claim 3 further comprising a step of forwarding a bug report to a bug report centre over a computer network.

7. A method for recovering an application from a runtime fault in a thread, the application being executed under an operating system having one or more low level exception handlers and a top level exception handler, the method comprising steps of:
   trapping an exception that is dispatched to the top level exception handler before the exception reaches the top level exception handler, the exception being caused due to a runtime fault in a thread executing an instruction of a C++ based application, a default action of the top level exception handler being to terminate the application upon receipt of exceptions;
   translating the trapped exception into a C++ exception that the C++ based application is capable of handling, wherein the trapped exception is translated into the C++ exception which is able to be resolved by an application based C++ exception handler;
   the method further comprises a step of determining if there is an application based C++ exception handler which is capable of resolving the translated exception;
   terminating the thread that caused the exception when there is no C++ based exception handler which is capable of resolving the translated exception;
   calling an application defined callback that supplies application-specific handling which re-executes the instruction and continues at a next line of code of the application; and
   continuing execution of the application.

8. The method recited in claim 7 further comprising a step of logging state information representing the state that the application was in before occurrence of the exception caused the termination of the thread.

9. The method recited in claim 8 further comprising a step of forwarding the logged information to a remote database over a computer network.

10. The method recited in claim 9 further comprising steps of:
    receiving a recommendation from the remote database; and
    informing the recommendation to the user.

11. The method recited in claim 8 further comprising a step of forwarding a bug report to a bug report centre over a computer network.

12. An application recovery system for recovering an application from a runtime fault, the application recovery system comprising:
    a processor;
    an exception dispatcher for receiving an exception caused due to a runtime fault in a thread executing an instruction of a C++ based application, and dispatching the exception to an exception handler;
    an exception trapper for trapping the exception before the exception reaches the exception handler when the exception handler is a top level exception handler and causes termination of the application;
    an exception translator for translating the exception trapped by the exception trapper into a C++ exception that the C++ based application is capable of handling;
    a trapped exception handler for handling the trapped exception, the trapped exception handler having:

an exception handler selector for determining if there is an application based C++ exception handler that is capable of resolving the exception translated by the exception translator;

a thread terminator for terminating the thread when there is no C++ based exception handler that is capable of handling the translated exception;

a crash recovery manager for calling an application defined callback that supplies application-specific handling which re-executes the instruction and continues at a next line of code of the application; and an executor for continuing execution of the application.

13. The application recover system as claimed in claim 12, wherein the exception trapper is provided in place of a top level exception handler which terminates the application.

14. An application recovery system for recovering an application from a runtime fault caused in a thread, the application running under an operating system on a processor having an exception dispatcher, one or more low level exception handlers and a top level exception handler which terminates the application, the application recovery system comprising:

an exception trapper placed between the exception dispatcher and the top level exception handler for trapping an exception before the exception reaches the top level exception handler; the exception being caused due to a runtime fault in a thread executing an instruction of a C++ based application;

an exception translator for translating the trapped exception trapper into a C++ exception that the C++ based application is capable of handling; and a trapped exception handler for handling the trapped exception, the trapped exception handler having:

an exception handler selector for determining if there is an application based C++ exception handler that is capable of resolving the exception translated by the exception translator;

a thread terminator for terminating the thread when there is no C++ based exception handler that is capable of handling the translated exception; and a crash recovery manager for calling an application defined callback that supplies application-specific handling which re-executes the instruction and continues at a next line of code of the application.

15. The application recovery system recited in claim 14, wherein the trapped exception handler further comprises a state restorer for restoring the state that the application was in before the fault occurred to continue the execution of the application.

16. The application recovery system recited in claim 14 further comprising a state information logger for logging information of the state that the application was in before the fault occurred.

17. The application recovery system recited in claim 16 further comprising a query generator for generating a query including the state information to query a recommendation from a remote database over a computer network.

18. The application recovery system as claimed in claim 17 further comprising a user advisor for receiving a recommendation from the remote database and informing the user of the recommendation.

19. The application recovery system as claimed in claim 17 wherein the query generator has a bug report generator for forwarding a bug report with the state information to a bug report centre.

20. A computer readable memory element storing the instructions or statements for use in the execution in a computer of a method for recovering an application from a runtime fault, the method comprising steps of:

receiving an exception caused due to a runtime fault in a thread executing an instruction of a C++ based application;

dispatching the exception to an exception handler;

trapping the exception before the exception reaches the exception handler when the exception handler is a top level exception handler which terminates the application;

translating the trapped exception into a C++ exception that the C++ application is capable of handling, wherein the trapped exception is translated into the C++ exception which is able to be resolved by an application defined C++ exception handler;

determining if there is an application based C++ exception handler which is capable of resolving the translated exception;

terminating the thread that caused the exception when there is no C++ based exception handler which is capable of resolving the translated exception;

calling an application defined callback that supplies application-specific handling which re-executes the instruction and continues at a next line of code of the application; and continuing execution of the application.

* * * * *

UNITED STATES PATENT AND TRADEMARK OFFICE
CERTIFICATE OF CORRECTION

PATENT NO. : 7,207,047 B2  
APPLICATION NO. : 09/903100  
DATED : April 17, 2007  
INVENTOR(S) : Subramanian et al.

Page 1 of 1

It is certified that error appears in the above-identified patent and that said Letters Patent is hereby corrected as shown below:

In the Claims

Claim 14, Col. 11, line 27, "handler;" should be --handler,--.

Claim 14, Col. 11, line 31, delete "trapper".

Signed and Sealed this
Fourteenth Day of October, 2014

Michelle K. Lee
*Deputy Director of the United States Patent and Trademark Office*